United States Patent
Lee et al.

(10) Patent No.: US 8,788,781 B2
(45) Date of Patent: Jul. 22, 2014

(54) DESCRIPTOR SCHEDULER

(75) Inventors: Chi Kong Lee, Fremont, CA (US);
Siu-Hung Fred Au, Fremont, CA (US);
Jungil Park, San Jose, CA (US);
Hyunsuk Shin, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 168 days.

(21) Appl. No.: 13/331,749

(22) Filed: Dec. 20, 2011

(65) Prior Publication Data

US 2012/0159052 A1    Jun. 21, 2012

Related U.S. Application Data

(60) Provisional application No. 61/425,098, filed on Dec. 20, 2010.

(51) Int. Cl.
*G06F 12/00* (2006.01)
(52) U.S. Cl.
USPC .......................... 711/168; 711/114; 711/169
(58) Field of Classification Search
None
See application file for complete search history.

(56) References Cited

U.S. PATENT DOCUMENTS

| | | | |
|---|---|---|---|
| 7,930,470 B2 | 4/2011 | Brittain et al. | |
| 8,255,615 B1 | 8/2012 | Yoon et al. | |
| 2002/0004878 A1 | 1/2002 | Norman | |
| 2004/0044933 A1 | 3/2004 | Jeddeloh | |
| 2004/0187122 A1 | 9/2004 | Gosalia et al. | |
| 2005/0018527 A1 | 1/2005 | Gorobets | |
| 2009/0077305 A1* | 3/2009 | Shin et al. | 711/103 |
| 2009/0089492 A1 | 4/2009 | Yoon | |
| 2009/0172264 A1 | 7/2009 | Chung et al. | |
| 2010/0043009 A1* | 2/2010 | Marchand | 718/104 |
| 2010/0058003 A1* | 3/2010 | Goto et al. | 711/154 |
| 2011/0145474 A1 | 6/2011 | Intrater | |

FOREIGN PATENT DOCUMENTS

| | | |
|---|---|---|
| WO | 0028418 | 5/2000 |
| WO | 2005098623 | 10/2005 |

OTHER PUBLICATIONS

Wikipedia entry for "IEEE 1394 Interface", [online] Retrieved from the Internet: <URL:http://en.wikipedia.org/IEEE_1394_interface>, [retrieved on Sep. 24, 2009], 9 pages.
Eich, Martine, Authorized Officer, European Patent Office, International Search Report and Written Opinion, PCT Application No. PCT/US2011/065913, Aug. 8, 2012, 14 pages.

* cited by examiner

*Primary Examiner* — Shawn X Gu (57) ABSTRACT

Methods, systems and computer program products for providing a sequencer that schedules job descriptors are described. The sequencer can manage the scheduling of the job descriptors for execution based on the availability of their respective segments and channels. For example, the sequencer can check the status of the segments, and identify one or more segments that are in busy or full state, or one or more segments that are in non-busy or empty state. Based on the status check, the sequencer can execute job descriptors out of order, and in particular, give priorities to job descriptors whose associated segments are available over job descriptors whose associated segments are in busy or full state.

20 Claims, 5 Drawing Sheets

| Command Number 308 | Command Type 310 | Channel 318 | Chip Enable 312 | T-Bit 314 | Memory 316 |
|---|---|---|---|---|---|
| 302 → 1 | Read | 1 | CE_ | 0 | 3rd |
| 304 → 2 | Program | 2 | CE_ | 0 | 6th |
| 306 → 3 | Read | 3 | CE_ | 1 | 7th |
| . | . | . | . | . | . |
| . | . | . | . | . | . |
| . | . | . | . | . | . |
| . | . | . | . | . | . |

DESCRIPTOR SCHEDULER

CROSS-REFERENCE TO RELATED APPLICATIONS

This application claims priority to U.S. Provisional Application Ser. No. 61/425,098 titled "DESCRIPTOR SCHEDULER," filed on Dec. 20, 2010, the disclosure of which is incorporated herein by reference in its entirety. This application is also related to U.S. application Ser. No. 12/569,089 titled "FLEXIBLE SEQUENCE DESIGN ARCHITECTURE FOR SOLID STATE MEMORY CONTROLLER," filed Sep. 29, 2009, now U.S. Pat. No. 8,255,615, and claims the benefit of priority to U.S. Provisional Application Ser. No. 61/143,386 filed Jan. 8, 2009.

BACKGROUND

The subject matter of this application is generally related to memory management.

Many electronic devices include embedded systems to control the operation of the underlying devices and to provide enhanced functionality and operational flexibility. Typically, non-volatile memory is included as a portion of the embedded system to store operating system program code, issued commands and critical data for operating the embedded system. Recently, embedded systems have begun to use solid state memory as non-volatile memory (e.g., electrically Erasable Read Only Memory (EEPROM)). Solid state memory can be used to accelerate applications to increase data access time, and can be advantageously programmed or re-programmed to provide non-volatile storage of information.

SUMMARY

Methods, systems and computer program products for providing a sequencer that schedules job descriptors are described. The sequencer can manage the scheduling of the job descriptors for execution based on the availability of their respective segments and channels. For example, the sequencer can check the status of the segments, and identify one or more segments that are in busy or full state, or one or more segments that are in non-busy or empty state. Based on the status check, the sequencer can execute job descriptors out of order, and in particular, give priorities to job descriptors whose associated segments are available over job descriptors whose associated segments are in busy or full state. In doing so, pending job descriptors can be processed quicker and unnecessary latency can be avoided.

In some implementations, a device is provided that includes a buffer manager having a plurality of segments each storing data associated with a different job descriptor of a plurality of job descriptors; a controller that controls a plurality of flash memory devices each operatively coupled to a corresponding channel, the controller configured to control a communication of the data associated with the respective job descriptor to or from the plurality of flash memory devices through the corresponding channel; and a sequencer that schedules an execution of each of the plurality of job descriptors based on an availability of a corresponding segment or channel.

In some implementations, a method is provided that includes receiving a first command to access a memory, the first command including at least one of a first segment that serves data associated with the first command, or a first instruction for retrieving data from or writing data to a first flash memory device through a first channel; receiving a second command, the second command including at least one of a second segment that serves data associated with the second command, or a second instruction for retrieving data from or writing data to a second flash memory device through a second channel; determining a segment status of the first segment and the second segment, or a channel status of the first channel and the second channel; and scheduling a processing of the first command and the second command based on the segment status or the channel status.

In some implementations, a system is provided that includes a host that issues a plurality of job descriptors each specifying at least one of a target segment or target channel; a buffer manager that controls a plurality of segments including the target segment, each segment associated with a different job descriptor for temporarily storing data associated with the different job descriptor, the data including data to be written to a flash memory device or the data read from the flash memory device; a plurality of flash memory devices each operatively coupled to a different channel for communicating the data associated with the different job descriptor between the host and the respective flash memory device; and a sequencer that schedules an execution of a job descriptor with respect to other job descriptors based on an availability of the target segment or the target channel.

One or more of the following advantages can be realized. The sequencer can check the status of the segments, and identify one or more segments that are in busy or full state, or one or more segments that are in non-busy or empty state. Based on the status check, the sequencer can execute job descriptors out of order, and in particular, give priorities to job descriptors whose associated segments are available over job descriptors whose associated segments are in busy or full state. In so doing, pending job descriptors can be processed quicker and latency can be avoided.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Systems, methods, and computer program products for providing a sequencer that schedules job descriptors are described. Traditional sequencers execute job descriptors in the order specified by or received from firmware. Each job descriptor is then served by an associated segment in that order. For example, an earlier-issued job descriptor "DES#1" is served by segment "0"; a later-issued job descriptor "DES#2" is served by segment "1" after the first job descriptor "DES#1" has been served by segment "0"; and a last-issued job descriptor "DES#3" is served by segment "2" after the later-issued job descriptor "DES#2" has been processed by segment "1."

When a job descriptor is designated for processing by its associated segment, conventional sequencers store the job descriptor in that segment if that segment is available or "empty." A segment is available or empty when data in that segment has been processed. The segment is unavailable or "full" when that segment is still processing old data or data from a previous cycle. When a segment is unavailable, its associated job descriptor is held at the conventional sequencer. Because job descriptors are processed in a specific order, later-issued job descriptors are also held at the conventional sequencer until the earlier-issued job descriptor has been executed.

For example, while an earlier-issued job descriptor "DES#1" is on hold due to the busy state of its assigned segment "0", the later-issued job descriptor "DES#2" is also held at the conventional sequencer and awaits processing, even if the segment (e.g., segment "1") assigned to store the later-issued job descriptor "DES#2" is available. When all the data in segment "0" has been processed and segment "0" becomes available again, the earlier-issued job descriptor "DES#1" is forwarded to segment "0" for storage. The later-issued job descriptor "DES#2" is then sent and stored in segment "1" after the first job descriptor "DES#1" has been executed and the first job descriptor "DES#1" can be released.

Due to a lack of scheduling scheme, conventional sequencers can suffer from latency issues because later-issued job descriptors (e.g., job descriptor "DES#2") may be stored and executed only upon completing the execution of the preceding job descriptor (e.g., job descriptor "DES#1"). During this "waiting" period, the later-issued job descriptors are "stuck" in the pipeline even though their respective segments are available for storage. The foregoing performance problem is also present in cases where the memory channel for transmitting data associated with the earlier-issued job descriptor is unavailable while other memory channels associated with the later-issued job descriptors are available. The later-issued job descriptors could not access the available channels until the earlier-issued job descriptor in the busy channel has been processed.

To overcome the various performance issues noted in the conventional sequencer, a sequencer as described herein can be configured to manage the scheduling of the job descriptors for execution based on the availability of their respective segments and channels. For example, the sequencer can check the status of the segments, and identify one or more segments that are in busy or full state, or one or more segments that are in non-busy or empty state. Based on the status check, the sequencer can execute job descriptors out of order, and in particular, give priorities to job descriptors whose associated segments are available over job descriptors whose associated segments are in busy or full state. For example, using the example given above, if the earlier-issued job descriptor "DES#1" is currently pending and awaiting access to segment "0", the sequencer can schedule the later-issued job descriptor "DES#2" for storage in segment "1" and execution first. In doing so, pending job descriptors can be processed quicker and latency can be avoided.

Similarly, the sequencer can check each of the memory channels and their respective availability status, and schedule the pending job descriptors based on these channel statuses. For example, if channel CH "0" assigned to the job descriptor "DES#1" is busy but channel CH "1" assigned to the job descriptor "DES#2" is idle or available, the sequencer can prioritize the job descriptors and schedule the job descriptor "DES#2" to be processed first via channel CH "1" before executing the job descriptor "DES#1."

By scheduling the job descriptors out-of-order and prioritizing the job descriptors based on the availability of segments or channels, the sequencer allows quicker memory flash operations such as memory read, write, and erase operations, and enhances the overall performance of the solid state controller that manages the data in the flash memory.

Flash Memory Overview

Figure 1:
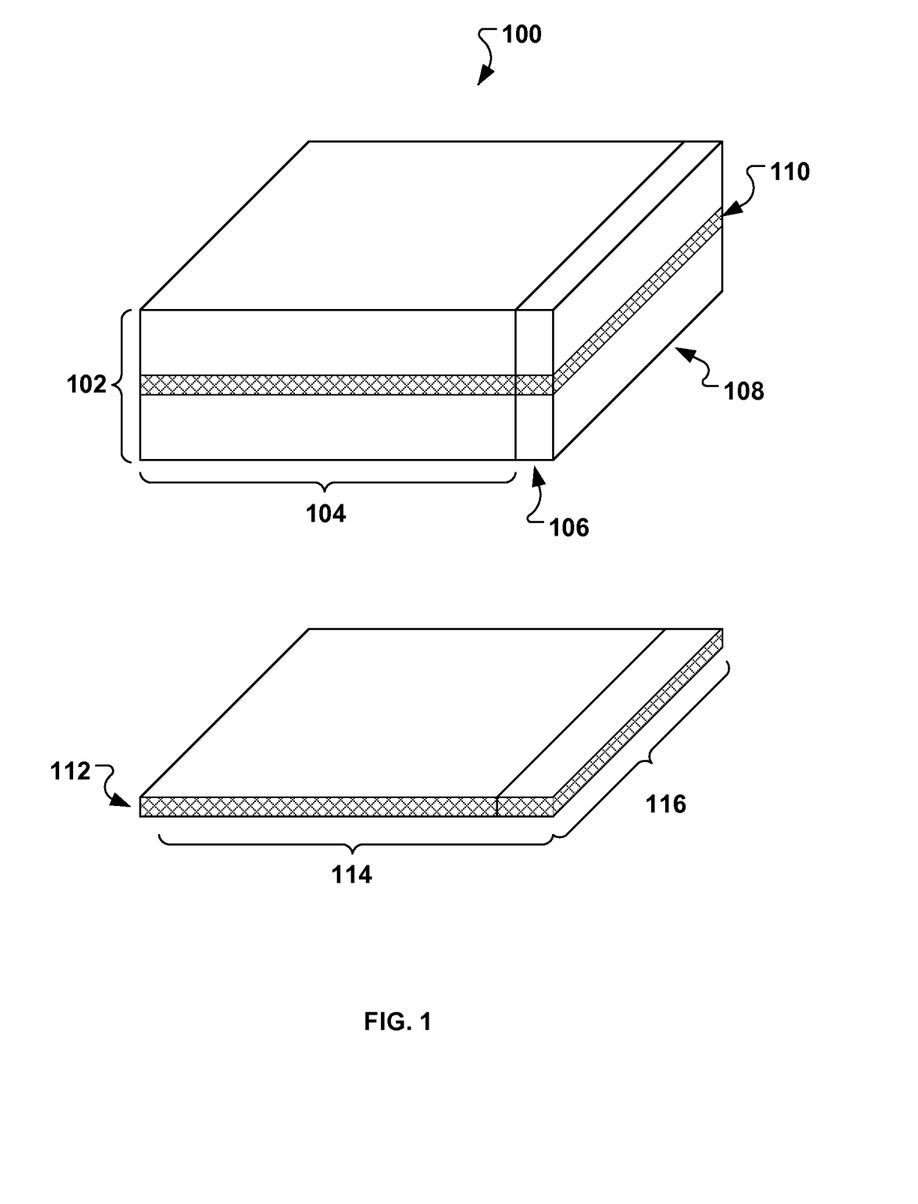
FIG. 1 shows a block diagram of an embodiment of a flash memory device.

Flash memory devices, such as flash electrically erasable programmable read only memory (EEPROM), are used in jump drives, memory cards, and other nonvolatile memory applications associated with cameras, video games, computers, and other electronic devices. FIG. 1 shows a block diagram of a flash memory device 100.

As shown in FIG. 1, the flash memory device 100 can be organized in bits. For example, the memory device 100 can be of the form of an array that includes 8-bits in depth 108. The flash memory device 100 also can be organized in bytes. For example, the flash memory device 100 can include a portion 104 containing 2K bytes, and a portion 106 containing 64 bytes. The flash memory device 100 further can be organized into pages. For example, the flash memory device 100 can include 512K pages 110. A single page 112 can be organized into two portions which can include portion 104 and portion 106 as a first portion 114, and a second portion 116. The second portion 116 can correspond to an eight-bit wide data input/output (I/O) path (e.g., I/O [0]-I/O [7]). Even further, the flash memory device 100 can be arranged in blocks. For example, the flash memory device 100 can include a block 102, which equals to 64 pages. The block can be sized to store one sector of user data and overhead data including information such as, without limitation, an error correction code (ECC) associated with the user data, a history of use of the block, defects and other physical information of the memory cell. The flash memory device 100 can be formed using the foregoing bits, bytes, pages and blocks.

In some implementations, the flash memory device can be a "NAND" type flash memory. NAND flash memory generally has faster erase and program times, higher density, lower cost per bit, and more endurance than, for example, NOR-type flash memory. NAND flash memory can utilize series strings of more than two memory cells, such as 16 or 32, connected along with one or more select transistors between individual bit lines and a reference potential to form columns of cells. Word lines can extend across cells within such columns. An individual cell within a column can be read and verified during programming by causing the remaining cells in the string to be turned on so that the current flowing through a string can be dependent upon the level of charge stored in the addressed cell.

A NAND flash I/O interface can be used for communicating with a NAND memory, and can allow sequential access to data stored in the NAND flash memory. The NAND flash I/O interface can include multiple pins each corresponding to a specific function. While only NAND flash memory has been described, it should be noted that other memory types also can be used, such as, without limitation, NOR flash EEPROM, AND flash EEPROM, DiNOR flash EEPROM, serial flash EEPROM, DRAM, SRAM, ROM, EPROM, FRAM, MRAM, and PCRAM.

Solid State Drive System

Figure 2A:
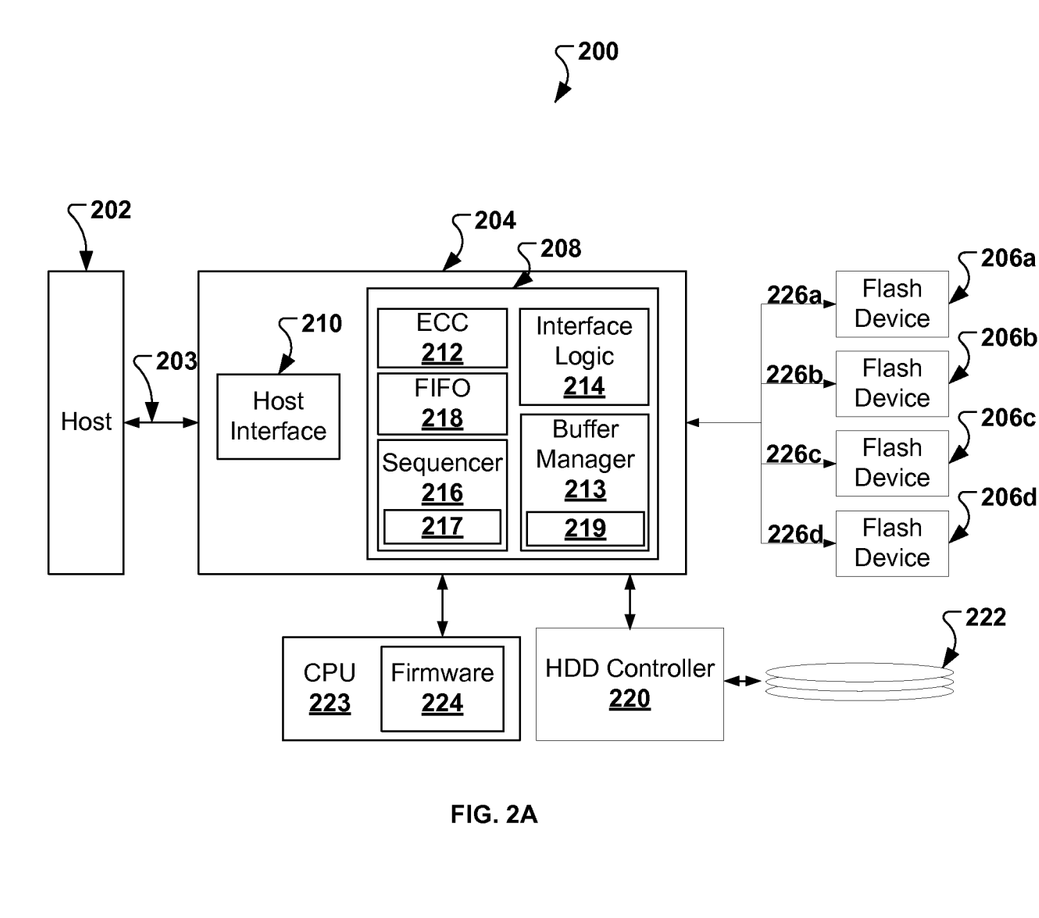
FIG. 2A shows an embodiment of a solid state drive system that includes one or more flash memory devices shown in FIG. 1.

FIG. 2A shows an embodiment of a solid state drive system 200 that includes one or more flash memory devices 206, such as that shown in FIG. 1. As shown in FIG. 2A, the system 200 includes a host 202 that communicates with a solid state drive 204 through a host interface 210. The host interface 210, in some implementations, can include a Serial Advanced Technology Attachment (SATA) interface or a Parallel Advanced Technology Attachment (PATA) interface. A SATA interface or PATA interface can be used to convert serial or parallel data into parallel or serial data, respectively. For example, if the host interface 210 includes a SATA interface, then the SATA interface can receive serial data transferred from the host 202 through a bus 203 (e.g., a SATA bus), and convert the received serial data into parallel data. In other implementations, the host interface 210 can include a hybrid interface. In these implementations, the hybrid interface can be used in conjunction with, for example, a serial interface.

The host interface 210, in some implementations, can include one or more registers in which operating commands and addresses from the host 202 can be temporarily stored. The host interface 210 can communicate a write or read operation to a solid state controller 208 in response to the stored information in the register(s).

In some implementations, the solid state drive 204 can support one or more channels (e.g., eight channels), and each channel can be configured to receive one or more control signals (e.g., four chip enable signals) to accommodate more than one command pending in an internal command queue 217, as will be discussed in greater detail below.

Flash Memory Device

Each flash memory device 206, in some implementations, can include a nonvolatile memory (e.g., a single-level flash memory or a multi-level flash memory). In some implementations, the nonvolatile memory can include a NAND-type flash memory module. A NAND-type flash memory module can include a command/address/data multiplexed interface such that commands, data, and addresses can be provided through corresponding input/output pins.

In some implementations, each flash memory device can be connected to a channel 226. Each channel can support, for example, one or more input and output lines, chip select signal lines, chip enable signal lines and the like. The channel also can support other signal lines such as write enable, read enable, read/busy output, and reset signal lines. In some implementations, the flash memory devices 206a-206d can share a common channel. In other implementations, to increase the degree of parallelism, each flash memory device can have its own channel connected to the solid state drive 204. For example, flash memory device 206a can be connected to the solid state drive 204 using channel 226a; flash memory device 206b can be connected to the solid state drive 204 using channel 226b; flash memory device 206c can be connected to the solid state drive 204 using channel 226c; and, flash memory device 206d can be connected to the solid state drive 204 using channel 226d.

In some implementations, the flash memory devices 206a-206d can be detachable. In some implementations, the flash memory devices 206a-206d can be connected to the solid state drive 204 using standard connectors. Examples of standard connectors can include, without limitation, SATA, USB (Universal Serial Bus), SCSI (Small Computer System Interface), PCMCIA (Personal Computer Memory Card International Association), and IEEE-1394 (Firewire).

In some implementations, each flash memory device 206 can include one or more solid state storage elements arranged in a bank. A solid state storage element can be partitioned into pages. In some implementations, a solid state storage element can have a capacity of 2000 bytes (i.e., one page). A solid state storage element, in some implementations, can include two registers to provide a total capacity of 4000-4096 bytes (i.e., 4 kB).

In some implementations, each flash memory device 206 also can include one or more banks each being selected using a chip enable signal or chip select signal. The chip enable or chip select signal can select one or more solid state storage elements in response to a host command.

In some implementations, each solid state storage element can include one or more single-level cell ("SLC") devices. In some implementations, each sold state storage element can include one or more multi-level cell ("MLC") devices. The SLC or MLC devices can be selected using a chip enable signal or chip select signal, which can be generated by the controller 208 using a combination of control and address information received from the host 202.

Where multiple banks are used, in some implementations, the solid state drive 208 can access more than one bank in a same flash memory device at the same time. In some implementations, the solid state drive 208 can access different banks in different flash memory devices at the same time. The capability to access more than one bank allows the solid state drive 204 to fully utilize the available resources and channels 226a-226d to increase the overall performance of the solid state drive 204. Furthermore, where the flash memory devices 206a-206d share a same memory input/output line and control signal (e.g., chip enable signal), the number of pins of the controller 208 can be reduced to further minimize the cost for manufacturing the solid state drive 204.

Solid State Controller

The solid state controller 208, which functions as a flash controller, receives one or more service requests or commands (e.g., read and program requests). The controller 208 can be configured to handle any command, status, or control request for access to the flash memory devices 206a-206d. For example, the controller 208 can be configured to manage and control storage and retrieval of data in the flash memory devices 206a-206d.

In some implementations, the controller 208 can be a part of a microcomputer system under the control of a microprocessor (not shown). The controller 208 can control the flow of commands and data between the host 202 and the solid state drive 204. In some implementations, the controller 208 can include read-only memory (ROM), random-access memory (RAM) and other internal circuits. The controller 208, in some implementations, can be configured to support various functions associated with the flash memory devices 206, such as, without limitation, diagnosing the flash memory devices 206, sending commands (e.g., activation, read, program, erase, pre-charge and refresh commands) to the flash memory devices 206, and receiving status from the flash memory devices 206. The controller 208 can be formed on a different chip as the flash memory devices 206a-206d (e.g., formed on a same chip as the solid state drive 204) or on a same chip.

As shown in FIG. 2A, the controller 208 can include an error checking code (ECC) 212, interface logic 214, a sequencer 216 and a first-in-first-out (FIFO) 218. In some implementations, the solid state drive 204 can include a central processor unit (CPU) 223 with embedded firmware 224 by which the controller 208 can be controlled. The CPU 223 can include a microprocessor, a signal processor (e.g., a digital signal processor) or microcontroller. In some implementations, the CPU 223 with the embedded firmware 224 can reside outside of the solid state drive 204.

In some implementations, the solid state drive 204 also can be connected to a hard disk drive (HDD) controller 220 for controlling one or more hard disks 222. The HDD controller 220 can be a controller for a mass storage system, an optical disk drive controller, or other similar controllers for managing data storage. In some implementations, the HDD controller 220 can be used in conjunction with the controller 208 to manage and control the flash memory devices and the hard disks 222 to maximize the storage capacity of the solid state system 200.

Interface Logic Module

The interface logic 214 can send commands, address and control information from the controller 208 to the flash memory devices 206a-206d. The interface logic 214 also can relay command status from the flash memory devices 206a-206d to the controller 208.

In some implementations, the interface logic 214 can be configured to support NAND-type flash memory and NOR-type flash memory. The interface logic 214 can communicate with the flash memory devices 206a-206d through channels 226a-226d. Where different types of flash memory devices are used (e.g., NAND memories and NOR memories), channels 226a-226d can be connected to the same or different types of memories. In some implementations, when read or program operations are carried out to different channels, the interface logic 214 can selectively perform, for example, software and hardware interleave operations. In other implementations, the interface logic 214 also can handle read and program operations for different channels concurrently.

In some implementations, the interface logic 214 can include, without limitation, one or more data ports, signal detectors, encoders, decoders, interleavers, de-interleavers, comparators and the like. The interface logic 214 can serve as an interface between the controller 208 and the flash memory devices 206a-206d for clocks, data masks, strobes, rank selects, memory address, memory commands, and read and program data. Where SLC or MLC devices (e.g., to store block and page buffers of data) are included in the flash memory devices 206a-206d, the interface logic 214 can provide a lower-level memory interface for communicating with the SLC/MLC devices.

FIFO

The FIFO 218 can operate using a first-in-first-out scheme, and can be configured to output data in a same order that is received (e.g., to output data that is received first). In some implementations, the FIFO 218 can include one or more registers each with a capacity of more than a virtual page of data segments. The FIFO 218 can be used to temporarily store data and commands that have not been processed while being transferred, for example, to the sequencer 216 and the flash memory devices 206 for execution. In some implementations, the ECC 212 and/or the interface logic 214 can utilize the FIFO 218 to buffer data transfer between the host 202 and the flash memory devices 206, and to provide error correction for data received from or transmitted to the flash memory devices 206. In some implementations, the FIFO 218 also can include an internal command queue (e.g., separate from internal command queue 217) through which the sequencer 216 can store commands or control signals for commanding or controlling the flash memory devices 206. The same or different internal command queue also can be used to store header and/or internal data between the embedded firmware (e.g., firmware 224) and the flash memory devices 206.

In some implementations, the FIFO 218 can generate data and control signals for transferring data to and receiving data from the controller 208 through, for example, an internal command queue 217 (as will be discussed below in greater detail) of the sequencer 216. The FIFO 218 can determine the transfer direction of the data stored in the internal command queue 217 based on, for example, commands from the host, the sequencer 204 or the flash memory devices 206a-206d.

In some implementations, data processed by the ECC 212 can be stored in the FIFO 218. In some implementations, the ECC 212 can release each data block stored in the FIFO 218 for code correction. Specifically, when the ECC 212 identifies errors in the data, correction can be applied to the data. The corrected data block can then be transferred from the FIFO 218 to a flash memory device selected by the sequencer 216 based on the command received from the host 202 after the ECC process on the data block is complete.

Error Correction Code

The flash memory devices 206a-206d are susceptible to defects and failures. A number of factors can give rise to such errors, including, for example, the gradual shifting of the threshold level of the memory states as a result of ambient conditions, stress from normal operations including programming, erasure, read operations and the like. Other errors can be contributed by, for example, a failing memory bit or bits in a flash device, faulty transmission to and from a flash device and the like. Thus, to prevent errors during operation, in some implementations, ECC 212 can be included in the controller 208 to ensure data integrity of the solid state drive system 200. The ECC 212 can be configured to detect and correct data failures caused by, for example, soft errors and hard errors at read, erase or program time In some implementations, the ECC 212 can be used for checking and correcting errors associated with the data and commands stored in the internal command queue 217 of the sequencer 216 prior to being sent to the flash memory devices 206. Additionally, the ECC 212 can be used for checking and correcting errors associated with the data transmitted to and received from the flash memory devices 206. For example, when data (e.g., a status command) is transferred from a flash memory device to the controller 208, the ECC 212 can execute an error detecting operation to ensure the integrity of the transferred data. If an error is detected among the transferred data, the ECC 212 can promptly request error correction from the controller 208 and subsequently perform data correction. The corrected data can then be sent to the sequencer 216 for further processing.

As an example operation, a read request can be queued by the sequencer 216 (as will be discussed in greater detail below) and sent to a flash memory device 206. The data can then be returned from the flash memory device 206 to the ECC 212. The ECC 212 can check the returned data for errors. If an error is detected but the error correction is disabled, then an error notification can be sent to the sequencer 216 in place of the data expected. The error notification can include an error report indicating that a data error has occurred. The failed location can then be disabled by moving the address of that location to a failed map. The routine can resume and wait for a next request. If the ECC 212 detects an error and the correction function is enabled, then the failed data can be corrected, verified and forwarded to the sequencer 216.

In some implementations, the controller 204 can generate redundant bits (e.g., parity bits) that can be appended to the data sectors during program operations. For example, a 512-byte data sector can include 16 bytes of ECC data appended, resulting in a 528-byte page. During read operations, the redundant data represented in the 16 bytes of ECC data can be utilized to detect and correct errors in the data read out from the flash memory device 206.

In some implementations, the ECC 212 also can be configured to detect and correct errors in the data flowing between the host 202 and the solid state device 204. The ECC 212 can implement an error correction scheme including cyclic redundancy check (CRC), and parity and forward error correction (FEC) when checking and correcting errors.

Sequencer

In some implementations, the sequencer 216 can be used to carry out the commands on behalf of the firmware 224. The sequencer 216 can control, for example, an access process of one or both of writing to and reading from one or more data sectors of the flash memory devices 206a-206d.

In some implementations, the sequencer 216 can store the commands received from the firmware 224 (or the host 202) in an internal command queue 217. The internal command queue 217 allows the controller 208 to perform multiple-block data access. In some implementations, the flash memory device (e.g., flash memory device 206a-d) includes a 512-byte page register built-in such that when data write to the flash memory device is performed, the data is written to the page register first before being written to the flash memory cell. Conventional flash controllers control the flash memory access cycles by transferring one single block (512 bytes) of data to the page register of the flash memory device at a time. Thus, no other access to the flash memory device is allowed once the 512-byte page register is filled. Consequently, the conventional flash controllers, which use a single-block data access methodology, limit the performance of storing and retrieving data to and from the flash memory devices.

To enhance data parallelism and expand the capability of the controller 208 to receive more than one command to any given flash memory device, the internal command queue 217 can be provided and function to store pending commands, and in some implementations, the internal command queue 217 can have a capacity suited to store thirty-two commands each representing one page of information. The host 202 can send multiple commands each containing unique data simultaneously to the controller 208, and the controller 208 can store such commands in the internal command queue 217 for concurrent or sequential transmission to the flash memory devices 206a-206d. Unlike the conventional single-block data-transfer controllers which transfer a single data block at a time, the controller 208, which utilizes the sequencer 216 and the internal command queue 217, allows more than one command to be sent to the flash memory devices 206a-206d, thus improving the data transfer performance significantly.

As an example, the host 202 can issue a read command, and send the read command to the sequencer 216. When the sequencer 216 receives the read command, the sequencer 216 can place the command in the internal command queue 217. The sequencer 216 then can identify the flash memory device to which the command is to be sent, and the address of the identified flash memory device at which data is to be read. After verifying that the identified flash memory device can be accessed at the address, the sequencer 216 can gate the address and the command to the identified flash memory device by selecting the identified flash memory device using a chip enable (or chip select) signal, and sending the address and the command out to the selected flash memory device. Upon receiving the read command (or a control signal indicating the read command) from the sequencer 216, the identified flash memory device can process the read command, and subsequently send serial data or command status information back to the sequencer 216. This process can continue until the last bit of the addressed data has been transmitted by the identified flash device and received by the sequencer 216.

In some implementations, the data received from the identified flash memory device can first be stored in the FIFO 218. If the data transmitted by the identified flash memory device contains a bad bit, the bad bit/bits can be replaced by a corrected bit/bits before sending the data to the sequencer 216. Alternatively, the data received from the identified flash memory device can be sent to the sequencer 216, after which the data is forwarded to the FIFO 218 to be sent out to the host 202. While the data waits in the FIFO 218, ECC processing can be performed on the data. After the command or sets of commands have been executed, the sequencer 216 can load a next command or set of commands in the internal command queue 217 for processing.

Similarly, when the host 202 issues a program command, the sequencer 216 can fetch the write data from the firmware 224 (or from the host 202). The firmware 224 can be embedded in the CPU 223 of the solid state drive 204 used for controlling the controller 208. Upon receipt of the data, the sequencer 216 can request the ECC 212 to perform an ECC error correction procedure. This allows errors that arise during transmission to be detected and corrected prior to being written into the identified flash memory device. The write data can be stored in the FIFO 218 while an ECC error correction procedure is performed, and subsequently routed to the designated flash device after correction.

In some implementations, data (e.g., which can include command, address and control information) can be formatted into serial data prior to being sent to the flash memory devices 206a-206d. A pipeline architecture also can be used to provide efficient throughput as the data is gated from interface logic 214 to the identified flash memory device. The data gated out of the interface logic 214, in some implementations, can first be verified prior to being sent to the identified flash memory device. After the data has been loaded into the identified flash memory device, the flash memory device can process the data including the command.

In some implementations, the sequencer 216 can execute each command on a rolling basis (e.g., execute each command as it is received). In other implementations, the sequencer 216 can determine whether the internal command queue 217 is full or nearly full (e.g., includes a predetermined number of commands). In some implementations, when the internal command queue 217 is full or nearly full, the sequencer 216 can execute the commands one by one or concurrently (e.g., all of the pending commands currently stored in the command queue 217 are executed together). Where the processing of multiple commands is desired, the interface logic 214 can be configured to execute the multiple commands in parallel. Optionally, the sequence 216 can include a multi-core system having multiple cores with each core configured to process one command so as to allow multiple commands to be executed at once.

For example, assuming that the internal command queue 217 can accommodate thirty-two commands, the sequencer 216 can monitor the internal command queue 217 to determine whether there are thirty two pending commands stored in the internal command queue 217. If there are thirty two pending commands, the sequencer 216 can execute all thirty two commands at the same time, and report the status of each executed command to the firmware 224 as the request associated with the command is being fulfilled. In some implementations, the sequencer 216 can issue one or more commands or control signals to the interface logic 214 such that the channels 226a-226d can begin the data transfer process concurrently.

Upon receiving one or more commands from the sequencer 216, the selected flash devices can perform the requested operations (e.g., read or program operations) associated with the commands. In some implementations, the firmware 224 need not poll the status of a command as the command is being carried out. In these implementations, the flash memory devices 206a-206d can forward command status information to the sequencer 216 through the interface logic 214, which can trigger an interrupt routine. When the interrupt routine is triggered, an interrupt (or other form of a message) can be sent to the firmware 224 to notify the firmware 224 of the command status information.

Figure 3:
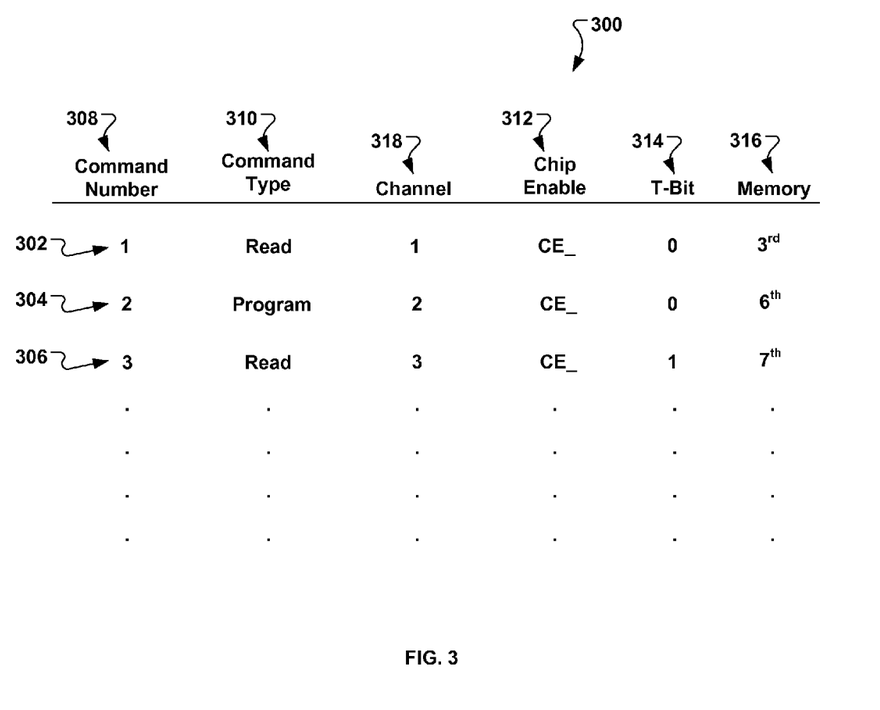
FIG. 3 shows an embodiment of an internal command queue with multiple pending commands each containing T-bits of information.

In some implementations, the sequencer 216 can report the status of a command to the firmware 224 in real time as the status is being sent from the corresponding flash memory device. In some implementations, the sequencer 216 can be configured so that the sequencer 216 reports the command status only when a specific condition is met. The specific condition can include an error detection, an error correction, a program delay and the like. In some implementations, the specific condition can depend on the information supplied by a T-bit in the command. FIG. 3 illustrates an example internal command queue 300 with multiple pending commands each containing T-bit information.

As shown in FIG. 3, a command 302 is currently stored in the internal command queue 300 to be executed. The command 302 can be received, for example, from the host 202. Each command can include information associated with a command number field 308, a command type field 310, a channel field 318, a chip enable field 312, a T-bit field 314 and a memory field 316.

The command number field 308 can be used to indicate the number of commands currently stored in the internal command queue 300. The command type field 310 can indicate the type of command associated with each command. For example, command 302 has a command type "read", which indicates that command 302 is a read command. As another example, command 304 has a command type "program", which indicates that command 304 is a program command.

The channel field 318 can define the channel (e.g., one of channels 226a-226d) through which the corresponding command is to be sent. As an example, command 302 is to be sent to the $3^{rd}$ flash memory device (as indicated in the memory field 316) in an array of flash memory devices through channel "1". As another example, command 304 is to be sent to the $6^{th}$ flash memory device through channel "2". As yet another example, command 306 is to be sent to the $7^{th}$ flash memory device through channel "3".

In some implementations, the firmware 224 can define the T-bit information of the T-bit field 314 for each command. In some implementations, the T-bit information serves as an indicator as to whether an interrupt routine for notifying the firmware 224 of command status information is to be triggered. For example, as shown in FIG. 3, the firmware 224 can designate the T-bit field 314 of command 306 as "1", indicating that the sequencer 216 is to send an interrupt to the firmware 224 when the status associated with command 306 is available from the $7^{th}$ flash memory device. As another example, the firmware 224 can designate the T-bit field 314 of command 302 as "0", indicating that the sequencer 216 need not send an interrupt to the firmware 224 when the status associated with command 302 is available from the $3^{rd}$ flash memory device. Similarly, the firmware 224 can designate the T-bit field 314 of command 304 as "0", indicating that the sequencer 216 need not send an interrupt to the firmware 224 when the status associated with command 304 is available from the $6^{th}$ flash memory device. The T-bit field 314, in general, can provide the firmware 224 the flexibility to define when and how often the firmware 224 is to be called upon so that use of unnecessary computing resources, and latency associated with receiving status information can be reduced to a minimum.

In some implementations, the firmware 224 can provide the T-bit information together with the commands received from the host 202 to the sequencer 216. In other implementations, the firmware 224 can provide the T-bit information and the commands received from the host 202 to the sequencer 216 separately.

The sequencer 216 can facilitate the overall processing of the pending commands including, without limitation, storing one or more pending commands received from the firmware 224, transferring a pending command to a corresponding flash memory device, coordinating the status polling of the command as the command is being processed by the flash memory device, and reporting the status of the command to the firmware 224.

In some implementations, the solid state drive 204 (and/or the host 202) can be mounted on a system on-chip (SOC). The SOC, in these implementations, can be fabricated using, for example, a semiconductor process. The SOC can include an embedded process system (e.g., an embedded CPU) separate from that in the solid state drive 204. The SOC also can include a SRAM, system logic, cache memory and cache controller for processing program code and data. The program code and data associated with the embedded process system can be stored in the flash device 206, and communicated to the SOC through, for example, an interface. This interface can be used by a translator (not shown) for translating information flowing between the interface and the internal bus structure of the SOC. Control signals can flow from the SOC to the flash memory devices 206a-206d while instructions and data can flow from the flash memory devices 206a-206d to the SOC during, for example, read operations. Of course, instructions and data also can flow towards the flash memory devices 206a-206d during, for example, erase operations.

Job Descriptor Scheduling

Figure 2B:
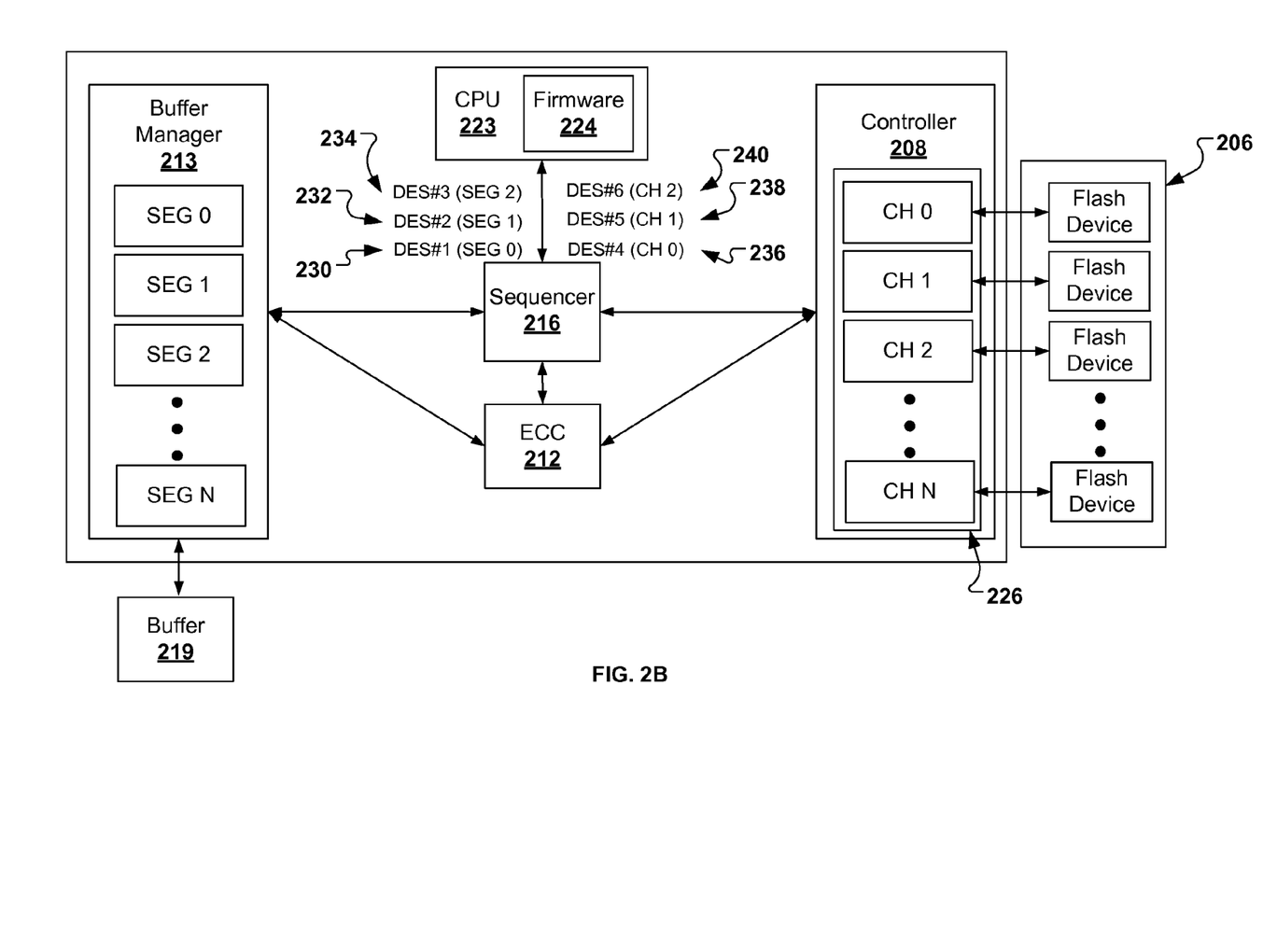
FIG. 2B shows a block diagram illustrating a sequencer implementing a scheduling scheme that schedules the execution of job descriptors.

FIG. 2B is a block diagram illustrating a job descriptor scheduling process. In some implementations, the firmware 224 can generate one or more commands in the form of job descriptors to the controller 208. As an example, the firmware 224 can generate job descriptors 230 (DES#1) and 232 (DES#2) each representing a processing operation such as a read, write, or erase operation. When the firmware 224 assigns a job to a flash memory device 206, a specific job descriptor is issued, which contains information such as, for example, the target segment, the target channel (e.g., any of the channels 226a-226d), the target flash memory device (e.g., any of the flash memory devices 206a-206d), the type of and amount of data, the type of operation (e.g., read, write, erase, or a combination thereof), and ECC power correction information.

The sequencer 216 can receive the job descriptors issued from the firmware 224, and schedule each of the job descriptors for storage and execution based on one or more scheduling conditions (as will be discussed in greater detail below). Scheduling the storage and execution of the issued job descriptors enhances data parallelism and maximizes data processing speed of the solid state drive 204 by allowing job descriptors whose assigned segments or channels are "available", "free", or not "busy" to be scheduled for storage and processing first before scheduling the processing of job descriptors whose assigned channels are currently unavailable or in a "busy state (as will be discussed in greater detail below). A busy segment becomes available when the job descriptor specifying the use of that segment has been executed and that segment is no longer needed (e.g., the data requested by the firmware 224 has been retrieved from or written to the flash memory device(s) 226).

When the sequencer 216 prioritizes the job descriptors and schedules the execution thereof, the job descriptors can be executed without incurring any delay resulting from a "stuck" condition that occurs when earlier-issued job descriptors are "trapped" in the processing pipeline and later-issued job descriptors cannot proceed until the earlier-issued job descriptors have been processed. The earlier-issued job descriptors may be "trapped" in the processing pipeline when their assigned channels or segments are temporarily unavailable. For example, where a job descriptor is assigned to segment "0" for temporary storage (e.g., before error checked and correction) but segment "0" is not available, the controller 208 could not proceed to execute the later-issued job descriptors until the earlier-issued job descriptor has been executed.

To manage all available bandwidth effectively, the sequencer 216 can schedule the job descriptors for storage and execution in a specific scheduling order. In some implementations, the sequencer 216 can check the availability of the target segment, target channel, and/or target flash memory device specified in a job descriptor, and schedule the job descriptor for temporary storage and execution as soon as the target segment, target channel, and/or the target flash memory device become(s) available. Unlike the conventional schemes that require the job descriptors to be executed in the order issued by the host (which gives rise to the "stuck" condition when an earlier-issued job descriptor awaits processing), the sequencer 216 can implement a scheduling scheme whereby the earlier-issued job descriptor is processed after the processing of the later-issued job descriptors. The sequencer 216 also can schedule the execution of multiple job descriptors at once if their respective target device, segment, or channel is available. By properly ordering and scheduling the execution of the job descriptors, data parallelism can be enhanced and latency issues can be reduced or eliminated.

In some implementations, the firmware 224 need not keep track of the status of each job descriptor. Instead, the firmware 224 can put several job descriptors into a single track by setting a particular bit of a job descriptor. For example, if the firmware 224 wants to put sixteen (16) descriptors in a single track, the T-bit (e.g., T-bit 314) of the last descriptor can be set. The T-bit allows multiple job descriptors to be grouped together and reported upon completed to the firmware 224 so that the firmware 224 need not spend too much time to serve each job descriptor. The sequencer 216 can then generate an interrupt signal to the firmware 224 when a track is completed (e.g., when all jobs defined in the job descriptors in the track are complete). The firmware 224 can program the job descriptors per track boundary. In some implementations, regardless of the track, each job descriptor can be issued in parallel so long as the target flash memory devices are available.

To execute the job descriptors effectively, the sequencer 216 can communicate with the buffer manager 213, and temporarily store each descriptor in the buffer 219 until the ECC 212 has identified and corrected all errors associated with a job descriptor (e.g., errors that occur while executing the job descriptor, or reading data from or writing data to a target flash memory device in response to the job descriptor). The buffer 219 can be a DDR SDRAM (double data rate synchronous dynamic random access memory) buffer, SDR SDRAM (single data rate synchronous dynamic random access memory), RDRAM (Direct rambus random access memory), or other similar types of memory having a fixed or variable partition size. In general, the buffer 219 can be a local memory that functions as a temporary storing facility for storing data associated with the job descriptors or the job descriptors themselves.

The buffer 219 can be divided into equal fixed-size partitions. For example, the buffer 219 can be divided into multiple partitions each having sixty-four (64) bytes. The number of partitions in the buffer 219 can be equal to the number of supported flows and flash memory devices, and the partitions can be of the same size. For example, the buffer 219 can be partitioned into four equally sized partitions each corresponding to one of the four flash memory devices 206a-206d.

The partitions also can be grouped into a plurality of virtual or logical groups. For example, the partitions can be divided into two groups with one group to be used for data write and another group to be used for data read. While the partitions are of equal size (e.g., four partitions in each group), the partitions also can be of different sizes (e.g., four partitions in one group, and twelve partitions in another group). The partitions also need not all be at contiguous addresses.

Virtual partitions are groupings of the data records, where the groupings are formed based on predefined rules or criteria. Each virtual partition can be associated with and mapped to a segment in the buffer 219 at any moment, and can be remapped to a different segment as additional segments are created. A segment is a physical area of the buffer 219 that has been reserved to store blocks of data (or portions thereof). A segment can be a data size unit (access unit) for one access of storage cache. The size of a segment can vary from cache partition area to cache partition area. All data records within a virtual partition can be stored in the segment to which the virtual partition is mapped. A segment can store data records belonging to one or more virtual partitions that are mapped to the segment. Other data that can be stored in a segment includes, without limitation, mapping table that maps address of the host 202 to the address of a target flash memory device 206 and other data that support firmware operation.

When servicing a job descriptor, the associated data or a block thereof can be sent to a segment in the buffer 219. Typically, portions read in one operation can be sent to the same logical segment in the buffer 219. The logical segments can be contiguous address spaces, and indicate a single set of continuous memory locations from the first memory location of the first partition to the last memory location of the last partition. For example, if there are "X" partitions in the buffer 219, and each partition is "Y" memory locations wide, then the first segment corresponds to the first X*Y memory locations, and the second segment corresponds to the next X*Y memory locations. The logical segments also can be scattered physically, linked, and managed by the buffer manager 213 and/or the controller 208.

The overall size of the buffer 219 can be one (1) gigabyte (Gb) or two (2) Gbs, and the buffer 219 can be divided into 256K partitions. In general, the buffer size is application and design dependent, and other buffer sizes also are contemplated. Each of the 256K partitions can be statically assigned to a flash memory device 206 and correspond to a different segment (e.g., segment "1" refers to the first partition) such that every flow and flash memory device is associated with one partition and segment.

To perform a read operation, the firmware 224 can issue a job descriptor requesting a read access of the flash memory device 206. Upon receiving the job descriptor, the sequencer 216 can identify, from content of the job descriptor, the segment to which the job descriptor is assigned. For example, the sequencer 216 can identify, from the content of the job descriptor 230, that segment "0" has been assigned for storing data retrieved or accessed from a target flash memory device. As another example, the sequencer 216 can identify segment "1" as having been assigned for storing data to be written to a target flash memory device in response to the job descriptor 232. As discussed above, the segment for each job descriptor can be assigned by the firmware 224. The assigned channel can be included in the content of each job descriptor. The content of each job descriptor can also include a logical block address (e.g., defining how data is stored in order of usage by a host such as CPU 223), a buffer address (e.g., defining a target segment), and a physical block address that identifies, for example, a target channel and a target flash memory device.

Figure 4:
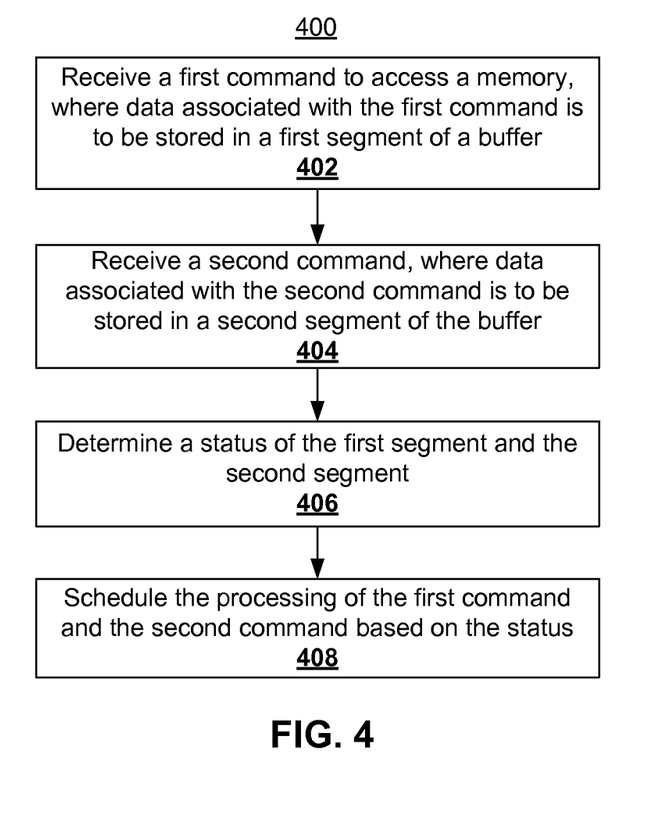
FIG. 4 is an example of a flow chart showing an example of a process for scheduling the job descriptors.

FIG. 4 is a flow chart showing an example of a process 400 for scheduling the job descriptors. Referring to FIG. 4, at 402, a first command is received to access a memory, where data associated with the first command is to be stored in a first segment of a buffer. For example, in scheduling the job descriptors for execution, the sequencer 216 can determine whether there is an earlier-issued job descriptor, and if so, whether the earlier-issued job descriptor is still pending. An earlier-issued job descriptor is pending when, for example, the segment serving the earlier-issued job descriptor is "full," "unavailable," or "busy." A "full," "unavailable," or "busy" segment means that the segment contains data and no available space. Conversely, a segment is "empty" or "available" when the segment contains no data.

For example, the sequencer 216 can determine that the job descriptor 230 is the first issued job descriptor, and therefore, there is no earlier-issued job descriptor pending prior to the issuance of the job descriptor 230. The sequencer 216 also can determine that the job descriptor 230 specifies segment "0" of the buffer 219 for temporary storage of data associated with the job descriptor 230 (e.g., data to be written to a target flash memory device or read from the target flash memory device).

At 404, a second command is received, where data associated with the second command is to be stored in a second segment of the buffer. As an example, the sequencer 216 can receive the job descriptor 232. When receiving the job descriptor 232, the sequencer 216 can determine that the job descriptor 232 is the second issued job descriptor, and that the firmware 224 has already issued the job descriptor 230 prior to the issuance of the job descriptor 232.

At 406, a status of the first segment and the second segment can be determined. For example, in determining the status of the first segment and the second segment, the sequencer 216 can request the buffer manager 213 for an update of the first segment and the second segment. For example, the buffer manager 213 can update the sequencer 216 with a status that segment "0" is busy (or full) and segment "1" is available (or empty). As another example, the buffer manager 213 can update the sequencer 216 with a status that both segments "0" and "1" are busy, or both segments "0" and "1" are available.

At 408, the processing of the first command and the second command can be scheduled based on the status. For example, to schedule the execution of the job descriptor 230 and the job descriptor 232, the sequencer 216 can first consider whether segment "0" (serving the job descriptor 230) is busy or available. The sequencer 216 also can consider whether segment "1" (serving the job descriptor 232) is busy or available. As an example, where segment "0" and segment "1" are both available, the sequencer 216 can execute both the job descriptor 230 and the job descriptor 232 in any order, or in the order assigned by the firmware 224. As another example, where segment "0" is unavailable but segment "1" is available, the sequencer 216 can schedule the job descriptor 232 whose data is to be stored and executed first. Once the data associated with the job descriptor 232 has been temporarily stored and the job descriptor 232 has been subsequently executed, data associated with the job descriptor 230 can be scheduled to be temporarily stored and the job descriptor 230 to be executed next. As yet another example, where segment "0" is available but segment "1" is unavailable, the sequencer 216 can schedule the job descriptor 230 to be executed first followed by the job descriptor 232.

In some implementations, the sequencer 216 need not consider whether segment "1" is busy or available if segment "0" is available because the job descriptor 230 is an earlier-issued descriptor, which can, by default, be given priority over later-issued job descriptors unless the segment to which the earlier-issued descriptor is unavailable.

Where there are additional job descriptors (e.g., those issued after the job descriptor 230 and the job descriptor 232), the foregoing scheduling process can be repeated to determine whether each of the segments to which these new job descriptors are assigned is also available. Priority can then be given to job descriptors whose associated segments are available, even though these job descriptors are later-issued descriptors.

As an example, where there is a later-issued job descriptor 234 (DES#3) assigned with an individualized segment (e.g., segment "2"), the sequencer 216 can prioritize between the job descriptor 230, the job descriptor 232, and the job descriptor 234 by further checking whether segment "2" is available. If segment "2" is available (but segment "0" and segment "1" are unavailable), then the sequencer 216 can schedule the temporary storage of the data associated with and execution of the job descriptor 234 first. As between the job descriptor 230 and the job descriptor 232, the scheduling process as previously discussed can be applied to determine their respective priority and schedule (e.g., job descriptor 232 to be scheduled first if segment "0" is unavailable and segment "1" is available, or job descriptor 230 to be scheduled first if segment "0" is available and segment "1" is unavailable).

The buffer manager 213 can store the data read/written from or to a target flash memory device. For example, the buffer manager 213 can store the data retrieved by the controller 208 in the buffer 219 for temporary storage and subsequent transmission to the CPU 223. As another example, the buffer 213 can store the data to be written to a target flash memory device (e.g., as received by the CPU 223 or another host) temporarily in the buffer 219 until all the data have been written to the target flash memory device by the controller 208. Optionally, the ECC 212 can check the retrieved data or data to be written by the controller 208 to determine whether the retrieved data or data to be written is error-free, and if the retrieved data or data to be written contains one or more errors, to perform error correction to remove these errors.

The ECC 212 can be in continuous communication with the sequencer 216 and the CPU 223 to update the sequencer 216 and the CPU 223 of any error(s) present in the data associated with the job descriptors. For example, the sequencer 216 can temporarily store the retrieved data until the retrieved data have been reviewed by the ECC 212 and sent to the corresponding segment of the buffer 219 for temporary storage. As another example, the sequencer can temporarily store the data to be written to a target flash memory device by the controller 208 until the data to be written have been reviewed by the ECC 212. Each segment in the buffer 219 can correspond to a command to be serviced, and stores the error-checked data. As discussed above, the CPU 223 and the firmware 224 can specify, in each command, the particular segment to which the retrieved data or data to be written is to be temporarily stored. For example, the read command issued by the CPU 223 can specify that data accessed in response to the job descriptor 230 be stored in segment "0."

In some implementations, in processing a job descriptor, the sequencer 216 can add a descriptor ID to the job descriptor to generate a new descriptor. The buffer manager 213 can store the data associated with the new descriptor in its corresponding segment until all the relevant data have been retrieved from the target flash memory device and transmitted to the buffer 219 or the ECC 212.

Where the retrieved data is checked by the ECC 212, the ECC 212 can process the retrieved data one-by-one as each block of the retrieved data is received from the controller 208. In some implementations, a job descriptor can include a buffer address field, and the ECC 212 can use the buffer address field in the job descriptor to send each block of the retrieved data to the correct segment in the buffer 219. The job descriptor can also include an ID field, and the ECC 212 can use the "ID" field in the job descriptor to transmit a signal to the sequencer 216 indicating that error checking for the corresponding block of the retrieved data has been completed.

The sequencer 216 can collect the data in the "ID" field as transmitted from the ECC 212. In some implementations, the sequencer 216 can be configured to store a listing recording the data identified in the ID field for each job descriptor. In this manner, the sequencer 216 can track each portion or block of the requested data that the controller 208 has retrieved in response to each of the issued job descriptors. When the sequencer 216 determines that the ECC 212 has transmitted all portions or blocks of data, the sequencer 216 can transmit a request to the buffer manager 213 to transmit all portions or blocks of the requested data to the CPU 223.

While the foregoing implementations are described with respect to retrieving (or reading) data in response to the read command, the same process also can be used for writing or erasing data. Similarly, the foregoing implementations also are applicable to scheduling the job descriptors based on the availability of the channels 226.

For example, each job descriptor can also be assigned a channel, and if the assigned channel of an earlier-issued job descriptor is unavailable, the sequencer 216 can schedule the later-issued job descriptors for execution first. The sequencer 216 can query the controller 208 for an update of each of the channels, or a status of a particular channel.

Upon receiving the respective channel status of each of the job descriptors, the sequencer 216 can schedule the execution of the job descriptors by determining the priority of the job descriptors. As an example, the sequencer 216 can receive a job descriptor 236 (DES#4) followed by another job descriptor 238 (DES#5). The sequencer 216 can determine from content of the respective job descriptors 236 and 238 that the job descriptor 236 is assigned to channel CH "0" and the job descriptor 238 is assigned to channel CH "1".

In determining the status of channel CH "1" and channel CH "0", the sequencer 216 can request the controller 208 for an update of the channels 226. For example, the controller 208 can update the sequencer 216 with a status that channel CH "0" is busy (or full) and channel CH "1" is available (or empty). As another example, the buffer manager 213 can update the sequencer 216 with a status that both segments "0" and "1" are busy, or both segments "0" and "1" are available.

A channel is available if a target flash memory device to which the channel is connected is idle. A target flash memory device is idle when, for example, the target flash memory device is not accessing its data in response to any job descriptor or command. For example, channel 226a is available if the flash memory device 206a is idle and available for access (or where there is no command/data transfer in channel 226a). Where a channel is assigned to multiple flash memory devices, a channel also can be considered idle if at least one assigned flash memory device is idle. As another example, channel 226b is unavailable if the flash memory device 206b is busy handling data write or data read.

To schedule the execution of the job descriptor 236 and the job descriptor 238, the sequencer 216 can consider whether channel CH "0" (to which the job descriptor 236 is assigned) is busy or available. The sequencer 216 also can consider whether channel CH "1" (to which the job descriptor 238 is assigned) is busy or available. For example, where channel CH "0" and channel CH "1" are both available, the sequencer 216 can execute both the job descriptor 236 and the job descriptor 238 in any order, or in the order issued by the firmware 224. As another example, where channel CH "0" is unavailable but channel CH "1" is available, the sequencer 216 can schedule the job descriptor 238 to be executed first. Once the job descriptor 238 has been executed, the job descriptor 236 can be scheduled to be executed next by the controller 208. As yet another example, where channel CH "0" is available but channel CH "1" is unavailable, the sequencer 216 can schedule the job descriptor 236 to be executed first by the controller 208, followed by the job descriptor 238.

Similar to the process for evaluating the availability of segments, the sequencer 216 need not consider whether channel CH "1" (to which the job descriptor 238 is assigned) is busy or available if channel CH "0" is available because the job descriptor 236 is an earlier-issued descriptor, which can, by default, be given priority over later-issued job descriptors unless the channel to which the earlier-issued descriptor is unavailable.

Where there are additional job descriptors (e.g., those issued after the job descriptor 236 and the job descriptor 238), the foregoing scheduling process can be repeated to determine whether each of the segments to which these new job descriptors are assigned is available. Priority can then be given to job descriptors whose associated channels are available, even though these job descriptors are later-issued descriptors.

As an example, where there is a later-issued job descriptor 240 (DES#6) that is assigned to channel CH "2", the sequencer 216 can prioritize between the job descriptor 236, the job descriptor 238, and the job descriptor 240 by further checking whether channel CH "2" is available. If channel CH "2" is available (but channel CH "0" and channel CH "1" are unavailable), then the sequencer 216 can schedule the temporary storage of the associated data and execution of the job descriptor 240 first. As between the job descriptor 236 and the job descriptor 238, the scheduling process as previously discussed can be applied to determine their respective priority and schedule (e.g., job descriptor 238 to be scheduled for execution first if channel CH "0" is unavailable and channel CH "1" is available, or job descriptor 236 to be scheduled for execution first if channel CH "0" is available and channel CH "1" is unavailable).

In sum, the sequencer 216 can operate as a scheduler that schedules when the job descriptors are to be executed. The firmware 224 can specify, in each job descriptor, all segment and channel information that the sequencer 216 can use for scheduling the temporary storage and execution of the job descriptors.

As discussed above, each job descriptor can function as a command for writing, reading, or erasing data to/from a target flash memory device. Blocks of data can be written to or read or erased from consecutive flash memory devices. Alternatively, blocks of data can be written to or read or erased from the same flash memory device. In another alternative, blocks of data can be distributed across multiple flash memory devices, and each flash memory device can include one or more sectors each physically storing a block or blocks of the data. A job descriptor can be issued to read blocks of data from or write blocks of data to multiple sectors included in multiple flash memory devices.

The sequencer 216 can schedule the execution of the job descriptors as each job descriptor is issued (e.g., scheduling can occur as soon as the firmware 224 issues a job descriptor to sequencer 216). Alternatively, the sequencer 216 can schedule the temporary storage and execution of the job descriptors once all the job descriptors or a subset thereof have been received.

While the foregoing implementations are described with respect to scheduling the job descriptors based on the availability of the segments or the channels, the sequencer 216 can also perform the scheduling based on the availability of both the segments and the channels. For example, where a segment and a channel assigned to a job descriptor are both available, the job descriptor can be scheduled for execution first over an earlier-issued job descriptor whose segment or channel is busy. As another example, where a segment assigned to a job descriptor is available but its channel is unavailable, the job descriptor can be scheduled for execution first over an earlier-issued job descriptor whose segment is unavailable even if the channel assigned to the earlier-issued job descriptor is available. As yet another example, where a segment assigned to a job descriptor is unavailable but its channel is available, the job descriptor can be scheduled for execution first over an earlier-issued job descriptor whose channel is unavailable, even if the segment assigned to the earlier-issued descriptor is available.

In some implementations, where both the respective segment of both an earlier-issued job descriptor and a later-issued job descriptor, the sequencer 216 can schedule the execution of the later-issued job descriptor first if the channel assigned to the later-issued job descriptor is available but the channel assigned to the earlier-issued job descriptor is unavailable. Where there are additional later-issued job descriptors, the later-issued job descriptors can be scheduled based on the order received if the segments or channels of the later-issued job descriptors are all available or unavailable.

As discussed above, the sequencer 216 can also query the buffer manager 213 and the controller 208 for the status of the segments of the buffer 219 and the channels 226, respectively. In some implementations, the sequencer 216 can query the buffer manager 213 for an estimation or prediction of how long it will take for a particular segment to become available for data storage. Similarly, the sequencer 216 can query the controller 208 for an estimation or prediction of how long it will take for a particular channel to become available. Such an estimation can be based on previous access of a segment or channel, or the type of operation currently being executed. This estimation can then be used to schedule between job descriptors whose segments are available but channels are unavailable and job descriptors whose segments are unavailable but channels are available.

As an example, the sequencer 216 can schedule a later-issued job descriptor (e.g., with an available channel and an unavailable segment) for execution first over an earlier-issued job descriptor (e.g., with an available segment and an unavailable channel) if the estimation shows that the unavailable segment of the later-issued job descriptor is likely to become available before the unavailable channel of the earlier-issued job descriptor becomes available.

The estimation also can be used to schedule competing job descriptors with equally-available segments and/or channels. For example, if both the segments (or channels) of the earlier-issued job descriptor and the later-issued job descriptor are both unavailable, the sequencer 216 can schedule the later-issued job descriptor for execution first over the later-issued job descriptor if the estimation shows that the segment (or channel) of the later-issued job descriptor is likely to become available first before the segment (or channel) of the earlier-issued job descriptor becomes available.

In addition to a length of time for a particular segment or channel to become available, the estimation also can depend on other criteria such as the importance of an operation (e.g., the sequencer 216 can give priority to critical job descriptors that must be completed in a very strict timeframe), condition(s) of a job descriptor (e.g., conditions that must be met before the job descriptor can be executed), and dependency constraint (e.g., based on the successful completion of other job descriptor).

As discussed above, priority and scheduling of the job descriptors can also depend on the type of operation being performed. For example, where there are one job descriptor (e.g., DES#6) specifying a write operation (e.g., transferring data from segment "6" to a flash memory device) and another job descriptor (e.g., DES#7) specifying a read operation (e.g., transferring data written by job descriptor DES#6 from the flash memory device to segment "7"), the sequencer 216 can schedule and give priority to DES#6 over DES#7. If DES#7 were to be given priority over DES#6, job descriptor DES#7 would have transferred old data and not the new data as written by DES#6 to the buffer 219.

The features described can be implemented in digital electronic circuitry, or in computer hardware, firmware, software, or in combinations of them. The apparatus can be implemented in a computer program product tangibly embodied in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

A number of embodiments of the invention have been described. Nevertheless, it will be understood that various modifications can be made without departing from the spirit and scope of the invention. Accordingly, other embodiments are within the scope of the following claims.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

A program (also known as a computer program, software, software application, script, or code) can be written in any form of programming language, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

What is claimed is:

1. A device comprising:
    a buffer manager comprising hardware and having a plurality of segments each storing data associated with a different job descriptor of a plurality of job descriptors;
    a controller comprising hardware and being configured to control a plurality of flash memory devices each operatively coupled to a corresponding channel, the controller configured to control a communication of the data associated with the respective job descriptor to or from the plurality of flash memory devices through the corresponding channel; and
    a sequencer comprising hardware and configured to receive the plurality of job descriptors in a first order and schedule a sequential execution of each of the plurality of job descriptors based on an availability of a corresponding segment and channel, wherein the scheduled sequential execution of the plurality job descriptors is in a second order, the second order being different than the first order.

2. The device of claim 1, wherein the plurality of job descriptors include a first job descriptor specifying a first segment that serves data associated with the first job descriptor and a second job descriptor specifying a second segment that serves data associated with the second job descriptor.

3. The device of claim 2, wherein the sequencer schedules an execution of the second job descriptor before the first job descriptor if the second segment is available and the first segment is unavailable.

4. The device of claim 2, wherein the sequencer schedules an execution of the first job descriptor before the second job descriptor if the first segment is available and the second segment is unavailable.

5. The device of claim 2, wherein:
    the plurality of job descriptors include a third job descriptor specifying a third segment that serves data associated with the third job descriptor; and
    the sequencer schedules an execution of the third job descriptor before the first job descriptor and the second job descriptor if the first segment and the second segment are unavailable, and the third segment is available.

6. The device of claim 2, wherein:
    the plurality of job descriptors include a third job descriptor specifying a third segment; and
    the sequencer schedules an execution of the third descriptor after the first job descriptor but before the second job descriptor if the first segment and the third segment are available, and the second segment is unavailable.

7. The device of claim 1, wherein the plurality of job descriptors include a first job descriptor specifying a first channel to be used for transmitting data to or receiving data from a first flash memory device and a second job descriptor specifying a second channel different from the first channel, the second channel to be used for transmitting data to or receiving data from a second flash memory device different from the first flash memory device.

8. The device of claim 7, wherein the sequencer schedules an execution of the second job descriptor before the first job descriptor if the second channel is available and the first channel is unavailable.

9. A method comprising:
receiving a first command to access a memory, the first command indicating at least one of a first segment that serves data associated with the first command, or a first instruction for retrieving data from or writing data to a first flash memory device through a first channel;
receiving a second command, the second command indicating at least one of a second segment that serves data associated with the second command, or a second instruction for retrieving data from or writing data to a second flash memory device through a second channel;
determining a segment status of the first segment and the second segment, or a channel status of the first channel and the second channel; and
scheduling a processing of the first command and the second command based on the segment status or the channel status such that an order of the scheduled processing for the first and second commands includes processing a later-issued command before an earlier-issued command.

10. The method of claim 9, wherein:
receiving the first command includes a first job descriptor specifying at least one of the first segment or the first instruction; and
receiving the second command includes a second job descriptor specifying at least one of the second segment or the second instruction.

11. The method of claim 10, further comprising determining the channel status of the first channel and the second channel,
wherein scheduling the processing of the first command and the second command includes scheduling the processing of the second job descriptor before the first job descriptor if the channel status indicates that the second channel is available and the first channel is unavailable.

12. The method of claim 10, further comprising determining the channel status of the first channel and the second channel,
wherein scheduling the processing of the first command and the second command includes scheduling the processing of the first job descriptor before the second job descriptor if the channel status indicates that the first channel is available and the second channel is unavailable.

13. The method of claim 10, further comprising:
receiving a third command that includes a third job descriptor specifying a third instruction for retrieving data from or writing data to a third flash memory device through a third channel.

14. The method of claim 13, further comprising determining a channel status of the first channel, the second channel, and the third channel,
wherein scheduling processing of the first job descriptor, the second job descriptor, and the third job descriptor includes scheduling the processing of the third job descriptor before the first job descriptor and the second job descriptor if the first channel and the second channel are unavailable, and the third channel is available.

15. The method of claim 13, further comprising determining a channel status of the first channel, the second channel, and the third channel,
wherein scheduling processing of the first job descriptor, the second job descriptor, and the third job descriptor includes scheduling the processing of the third descriptor after the first job descriptor but before the second job descriptor if channel status indicates that the first channel and the third channel are available, and the second channel is unavailable.

16. The method of claim 10, further comprising determining the segment status of the first segment and the second segment,
wherein scheduling the processing of the first command and the second command includes scheduling the processing of the second job descriptor before the first job descriptor if the second segment is available and the first segment is unavailable.

17. The method of claim 10, further comprising determining the segment status of the first segment and the second segment,
wherein scheduling the processing of the first command and the second command includes scheduling the processing of the first job descriptor before the second job descriptor if the first segment is available and the second segment is unavailable.

18. The method of claim 10, further comprising receiving a third command that includes a third job descriptor specifying a third segment that serves data associated with the third job descriptor,
wherein:
determining the segment status includes determining segment status of the first segment, the second segment, and the third segment; and
scheduling the processing of the first command and the second command includes scheduling processing of the third job descriptor before the first job descriptor and the second job descriptor if the first segment and the second segment are unavailable, and the third segment is available.

19. The method of claim 10, further comprising receiving a third command that includes a third job descriptor specifying a third segment that serves data associated with the third job descriptor,
wherein:
determining the segment status includes determining segment status of the first segment, the second segment, and the third segment; and
scheduling the processing of the first command and the second command includes scheduling processing of the third descriptor after the first job descriptor but before the second job descriptor if the first segment and the third segment are available, and the second segment is unavailable.

20. A system comprising:
a host that issues a plurality of job descriptors each specifying at least one of a target segment or target channel;
a buffer manager that controls a plurality of segments including the target segment, each segment associated with a different job descriptor for temporarily storing data associated with the different job descriptor, the data including data to be written to a flash memory device or data read from the flash memory device;
a plurality of flash memory devices each operatively coupled to a different channel for communicating each data associated with a different job descriptor between the host and the respective flash memory device; and a sequencer that schedules an execution of a job descriptor with respect to other job descriptors based on an availability of the target segment or the target channel such that an order of the scheduled execution includes executing a later-issued job descriptor before an earlier-issued job descriptor.

* * * * *